(12) United States Patent
Young et al.

(10) Patent No.: US 11,863,712 B1
(45) Date of Patent: Jan. 2, 2024

(54) DAISY CHAINING DASH CAMS

(71) Applicant: Samsara Inc., San Francisco, CA (US)

(72) Inventors: Ryan Young, San Francisco, CA (US);
Justin Delegard, Cincinnati, OH (US);
Naveen Chinya Krishnamurthy, Fremont, CA (US); Narendran Rajan, San Diego, CA (US); Kiren Sekar, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/495,636

(22) Filed: Oct. 6, 2021

(51) Int. Cl.
*H04N 7/18* (2006.01)
*H04N 23/66* (2023.01)

(52) U.S. Cl.
CPC ............ *H04N 7/181* (2013.01); *H04N 23/66* (2023.01)

(58) Field of Classification Search
CPC ............................. H04N 23/66; H04N 7/181
USPC .................................................... 348/148, 47
See application file for complete search history.

(56) References Cited

U.S. PATENT DOCUMENTS

| | | | |
|---|---|---|---|
| 5,917,433 A | 6/1999 | Keillor et al. | |
| 6,452,487 B1 | 9/2002 | Krupinski | |
| 8,633,672 B2 | 1/2014 | Jung et al. | |
| 9,024,744 B2 | 5/2015 | Klose et al. | |
| 9,445,270 B1 | 9/2016 | Bicket et al. | |
| 9,477,639 B2 | 10/2016 | Fischer et al. | |
| 10,033,706 B2 | 7/2018 | Bicket et al. | |
| 10,085,149 B2 | 9/2018 | Bicket et al. | |
| 10,102,495 B1 | 10/2018 | Zhang et al. | |
| 10,173,486 B1 | 1/2019 | Lee et al. | |
| 10,173,544 B2 | 1/2019 | Hendrix et al. | |
| 10,196,071 B1 | 2/2019 | Rowson et al. | |
| 10,206,107 B2 | 2/2019 | Bicket et al. | |
| 10,390,227 B2 | 8/2019 | Bicket et al. | |
| 10,579,123 B2 | 3/2020 | Tuan et al. | |
| 10,609,114 B1 | 3/2020 | Bicket et al. | |
| 10,623,899 B2 | 4/2020 | Watkins et al. | |
| 10,827,324 B1 | 11/2020 | Hajimiri et al. | |
| 10,843,659 B1 | 11/2020 | Innocenzi et al. | |
| 11,046,205 B1 | 6/2021 | Govan et al. | |
| 11,122,488 B1 | 9/2021 | Lloyd et al. | |
| 11,126,910 B1 | 9/2021 | Akhtar et al. | |
| 11,127,130 B1 | 9/2021 | Jain et al. | |
| 11,128,130 B2 | 9/2021 | Jain et al. | |
| 11,131,986 B1 | 9/2021 | Gal et al. | |
| 11,132,853 B1 | 9/2021 | Akhtar et al. | |
| 11,137,744 B1 | 10/2021 | Heddleston et al. | |

(Continued)

*Primary Examiner* — Jonathan R Messmore
*Assistant Examiner* — Asmamaw G Tarko
(74) *Attorney, Agent, or Firm* — Knobbe, Martens, Olson & Bear, LLP

(57) ABSTRACT

Multiple cameras within a vehicle, such as placed at multiple locations inside and/or outside a bus or semi-truck and trailer, may be chained together to provide a consolidated video stream that may be recorded and/or transmitted wirelessly to a cloud storage device. Rather that each of the cameras independently recording and/or streaming video content, each camera may be configured to deserialize an input video to identify video streams from separate cameras (e.g., such as based on associate virtual channel identifiers) and reserialize its own video stream with the other video streams in the received input. The serialized video stream is then transmitted to a next camera in the daisy chain and/or a video storage device.

17 Claims, 9 Drawing Sheets

(56) References Cited

U.S. PATENT DOCUMENTS

| | | |
|---|---|---|
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,451,610 B1 | 9/2022 | Saunders et al. |
| 11,451,611 B1 | 9/2022 | Saunders et al. |
| 11,479,142 B1 | 10/2022 | Govan et al. |
| 11,522,857 B1 | 12/2022 | Symons et al. |
| 11,558,449 B1 | 1/2023 | Bicket et al. |
| 11,570,400 B2* | 1/2023 | Balcioglu ............ H04N 7/104 |
| 11,599,097 B1 | 3/2023 | Gal et al. |
| 11,606,736 B1 | 3/2023 | Lloyd et al. |
| 11,641,388 B1 | 5/2023 | Saunders et al. |
| 11,641,604 B1 | 5/2023 | Lloyd |
| 11,643,102 B1 | 5/2023 | Calmer et al. |
| 2002/0061758 A1 | 5/2002 | Zarlengo et al. |
| 2005/0286774 A1 | 12/2005 | Porikli |
| 2006/0167591 A1 | 7/2006 | McNally |
| 2007/0097224 A1* | 5/2007 | Haneda ............. H04N 13/296 348/221.1 |
| 2008/0319602 A1 | 12/2008 | McClellan et al. |
| 2009/0116515 A1* | 5/2009 | Boomer ............... H04J 3/047 370/538 |
| 2009/0202134 A1* | 8/2009 | Kano ............... G06V 30/1444 382/141 |
| 2009/0240427 A1 | 9/2009 | Siereveld et al. |
| 2010/0049639 A1 | 2/2010 | Ferro et al. |
| 2011/0167176 A1* | 7/2011 | Yew ................. G06F 13/4247 710/6 |
| 2011/0276265 A1 | 11/2011 | Husain |
| 2012/0201277 A1 | 8/2012 | Tanner et al. |
| 2012/0235625 A1 | 9/2012 | Takehara |
| 2012/0303397 A1 | 11/2012 | Prosser |
| 2013/0162421 A1 | 6/2013 | Inaguma et al. |
| 2013/0244210 A1 | 9/2013 | Nath et al. |
| 2014/0012492 A1 | 1/2014 | Bowers et al. |
| 2014/0022383 A1* | 1/2014 | Huang ................ H04N 7/183 382/232 |
| 2014/0095061 A1 | 4/2014 | Hyde |
| 2014/0098060 A1 | 4/2014 | McQuade et al. |
| 2014/0195106 A1 | 7/2014 | McQuade et al. |
| 2014/0278108 A1 | 9/2014 | Kerrigan et al. |
| 2014/0354227 A1 | 12/2014 | Tyagi et al. |
| 2014/0354228 A1 | 12/2014 | Williams et al. |
| 2015/0044641 A1 | 2/2015 | Chauncey et al. |
| 2015/0074091 A1 | 3/2015 | Walkin et al. |
| 2015/0201827 A1* | 7/2015 | Sidar ................ A61B 1/00011 348/65 |
| 2015/0226563 A1 | 8/2015 | Cox et al. |
| 2015/0283912 A1 | 10/2015 | Shimizu et al. |
| 2016/0198089 A1* | 7/2016 | Motohashi ............ H04N 23/90 348/36 |
| 2016/0275376 A1 | 9/2016 | Kant |
| 2016/0288744 A1 | 10/2016 | Rutherford et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0102463 A1 | 4/2017 | Hwang |
| 2017/0140603 A1 | 5/2017 | Ricci |
| 2017/0263049 A1 | 9/2017 | MacDonald et al. |
| 2017/0286838 A1 | 10/2017 | Cipriani et al. |
| 2017/0291611 A1 | 10/2017 | Innes et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0093672 A1 | 4/2018 | Terwilliger et al. |
| 2018/0262724 A1 | 9/2018 | Ross |
| 2019/0003848 A1 | 1/2019 | Hoten et al. |
| 2019/0118655 A1 | 4/2019 | Grimes et al. |
| 2019/0132555 A1* | 5/2019 | Chu ................. H04N 7/181 |
| 2019/0174158 A1 | 6/2019 | Herrick et al. |
| 2019/0244301 A1 | 8/2019 | Seth et al. |
| 2019/0250611 A1* | 8/2019 | Costin ............... G05D 1/0257 |
| 2019/0286948 A1 | 9/2019 | Sathyanarayana et al. |
| 2019/0289172 A1* | 9/2019 | Bangs ................ H04N 23/66 |
| 2019/0318419 A1 | 10/2019 | VanderZanden |
| 2019/0327590 A1 | 10/2019 | Kubo et al. |
| 2019/0327613 A1 | 10/2019 | Bicket et al. |
| 2019/0387197 A1* | 12/2019 | Balcioglu ............ H03M 3/428 |
| 2020/0074397 A1 | 3/2020 | Burda et al. |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0388005 A1* | 12/2020 | Mueller ............. G06T 3/0056 |
| 2020/0389415 A1 | 12/2020 | Zhao et al. |
| 2021/0006950 A1 | 1/2021 | Hajimiri et al. |

* cited by examiner

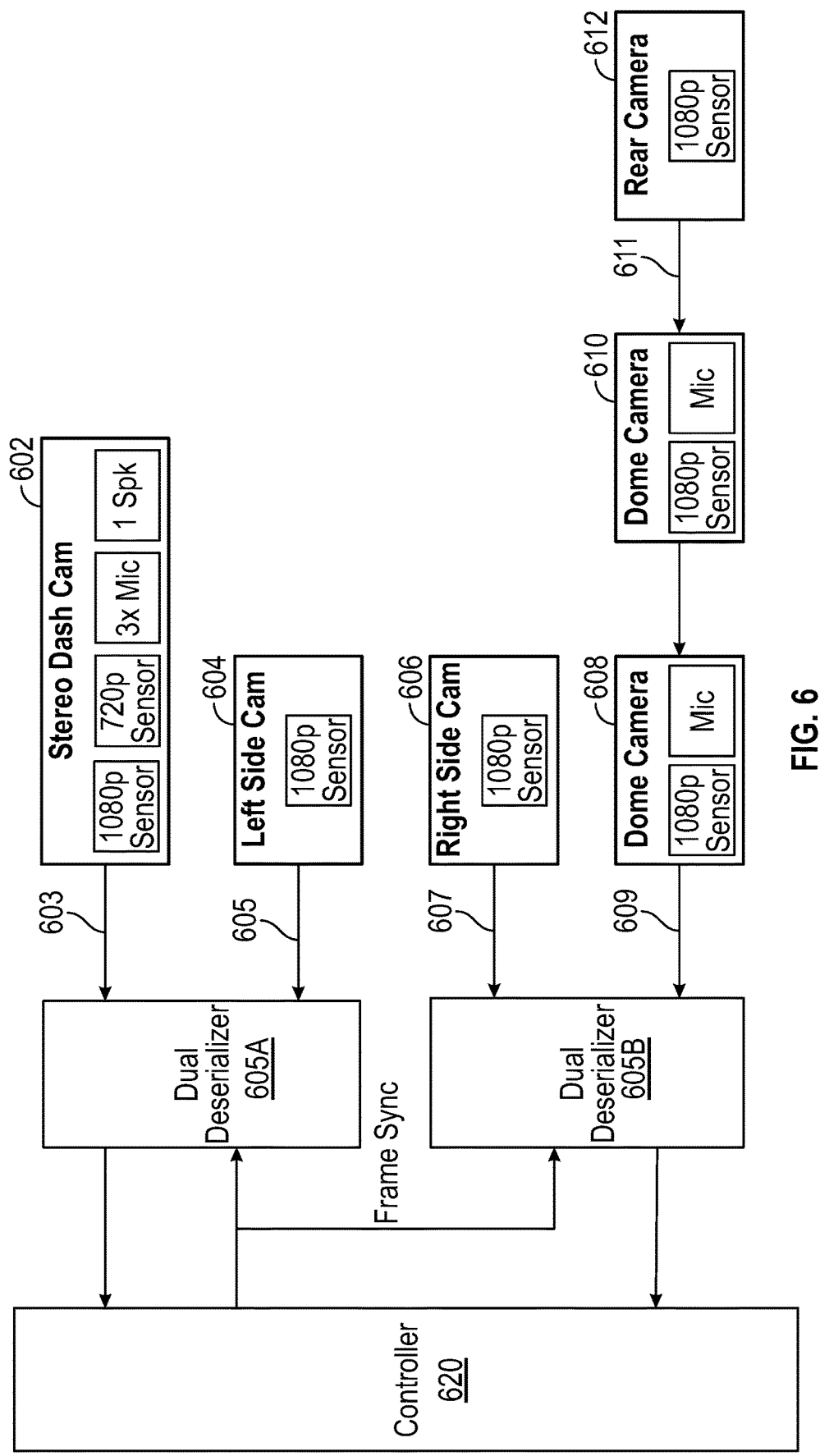

DAISY CHAINING DASH CAMS

FIELD

Embodiments of the present disclosure relate to devices, systems, and methods for managing multiple streams of video data, such as from multiple Internet of Things (IoT) devices and/or multiple vehicle cameras in or on a vehicle.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Multiple cameras may be associated with a vehicle (e.g., in or one the vehicle) to provide video of various areas within and/or outside of the vehicle. Particularly for larger vehicles, such as buses, RVs, semi-trucks and trailers, etc., a large number of video cameras (also referred to generally herein as vehicle cameras), such as 4, 8, 10, 12, 15, 20, or more cameras may be mount on or in the vehicle. Each of the cameras is typically hard wired to a controller, such as a network video recorder, that receives and stores the independent video feeds from individual cameras. However, installation of multiple cameras, and particularly the separate cabling from each camera to a controller becomes cumbersome, may require multiple holes in the vehicle to route cables to the controller. Additionally, controllers that receive separate video fees on separate cables from each camera must include separate input ports for each of the cameras, which may limit the number of cameras that can be used to the number of input ports on the controller.

SUMMARY

The systems, methods, and devices described herein each have several aspects, no single one of which is solely responsible for its desirable attributes. Without limiting the scope of this disclosure, several non-limiting features will now be described briefly.

Multiple cameras within a vehicle, such as placed at multiple locations inside and/or outside a bus or semi-truck and trailer, may be chained together to provide a consolidated video stream that may be recorded and/or transmitted wirelessly to a cloud storage device. Rather that each of the cameras independently recording and/or streaming video content, each subsequent camera (e.g., other than the camera that is furthest from the video recording device) may deserialize the input video to identify video streams from separate cameras (e.g., such as based on associated virtual channel identifiers) and reserialize its own video stream with the other video streams in the received input. The serialized video stream is then transmitted to a next camera in the daisy chain and/or a video storage device. Advantageously, this configuration allows use of a fewer cables (e.g., a combined set of one or more electrical or optical signal carrying wires) in providing video streams from each of the daisy chained cameras to the controller.

Further, as described herein, according to various embodiments systems and or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays).

Additionally, the present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, machine vision devices, and may enable a user to more quickly and accurately access, navigate, assess, and digest analyses, configurations, image data, and/or the like, than previous systems.

Various embodiments of the present disclosure provide improvements to various technologies and technological fields, and practical applications of various technological features and advancements. Additionally, various embodiments of the present disclosure are inextricably tied to, and provide practical applications of, computer technology. In particular, various embodiments rely on detection of user inputs via graphical user interfaces, operation and configuration of algorithmic models, calculation of updates to displayed electronic data based on user inputs, automatic processing of image data, and presentation of updates to displayed images and analyses via interactive graphical user interfaces. Such features and others are intimately tied to, and enabled by, computer and machine vision technology, and would not exist except for computer and machine vision technology.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 6 is another block diagram illustrating an example arrangement of cameras that may each be positioned at different locations within (or outside of) a vehicle and configured to communicate with a controller via multiple serialized communication channels.

DETAILED DESCRIPTION

Figure 1A:
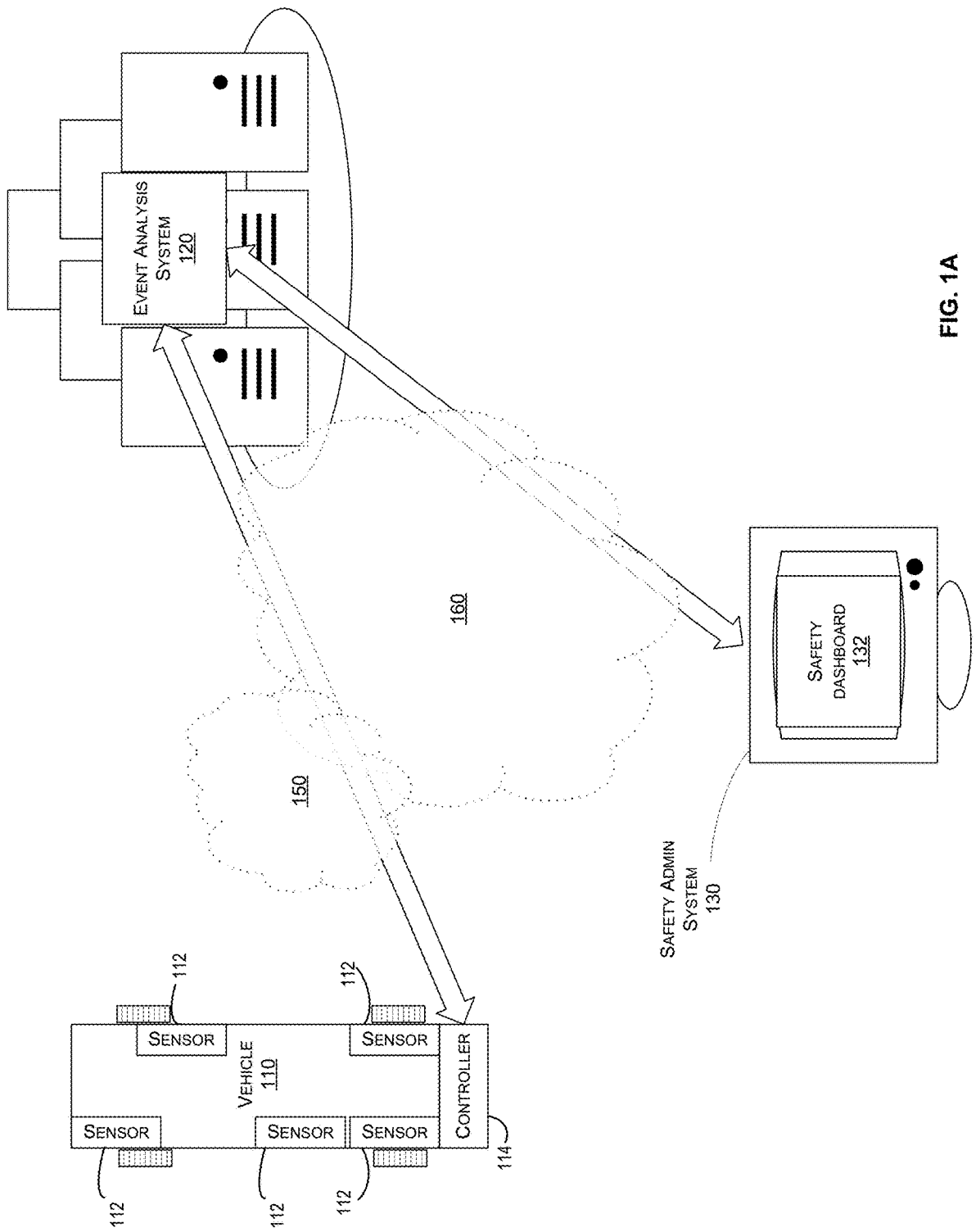
FIG. 1A illustrates an event analysis system in communication with a vehicle device and a safety admin system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Controller (or Gateway): an electronic device that is configured to receive sensor data from one or more sensor devices positioned on or in a vehicle. For example, a controller may be positioned in a front (e.g., cab) of a vehicle and may be coupled to one or more sensor devices (e.g., vehicle cameras) positioned in or on the vehicle. A controller may include communication circuitry configured to transmit data to a backend (or "cloud" server), for example, video data from one or more of the coupled sensor devices.

Sensor Device (also referred to generally herein as a "vehicle camera" or "camera"): an electronic device that includes one or more sensors positioned on or in a vehicle. A sensor device may include sensors, such as one or more video sensors, audio sensors, accelerometers, global positioning systems (GPS), and the like.

Sensor Data: any data generated by a sensor device and/or received by a controller, such as video files, still images, audio data, accelerometer data, global positioning system (GPS) data, ECU data, vehicle speed data, forward camera object tracking data, driver facing camera data, hand tracking data and/or any other related data and/or other data files. Sensor data may include, for example:

Video files, which may be uploaded for each camera of a multi-camera vehicle device.

Still Images, e.g., single frames of a video file, which may be transmitted to the event analysis system either as part of initial event data transmitted to the event analysis system after detecting a safety event and/or in response to a request for still images from the event analysis system. In situations where the event analysis system requests still images from a vehicle device, the event analysis system may determine image settings (e.g., image quality, downsampling rate, file size, etc.), as well as timeframe from which images are requested (e.g., one image every 0.2 seconds for the five second time period preceding the detected event).

Audio data can be combined with video or sent separately and transcoded into video files after the fact. The event analysis system may determine audio transcoding parameters for requested audio data.

High-resolution video: video files that are renderable to depict significant detail. For example, high-resolution video may be 4K Ultra HD video recorded at 60 fps or more. The term high-resolution video does not signify any particular resolution or frame rate, but more generally indicates a video file that holds more image detail than a corresponding low-resolution video.

Low-resolution video: video files that are renderable to depict less detail than a corresponding high-resolution video file. For example, low-resolution video may be 1080p at 30 fps or less. The term low-resolution video does not signify any particular resolution or frame rate, but more generally indicates a video file that holds less image detail than a corresponding high-resolution video.

Cable: one or more wires that share a protective casing and are configured for carrying electrical or optical telecommunication signals.

Serializer/Deserializer (or "SerDes"): components that may be used in high-speed communications to compensate for limited input/output bandwidth. A The components convert data between serial data and parallel interfaces in each direction. For example, a serializer coverts data (e.g., one or more video files) into a serial bitstream, which may then be deserializer by another device into multiple data files (e.g., the one or more video files). The serial communications may be via a single line or a differential pair, for example, to minimize the number of I/O pins, connection ports, cables, etc.

Combined Media File: a file typically generated by a vehicle device to include time-synced high-resolution video, low-resolution video, and/or metadata for a particular time period. For example, a vehicle device may generate a combined media file that include video and audio data that is transmitted to another vehicle device or gateway.

Event Data: data associated with an event, such as a set of sensor data (e.g., metadata and/or asset data), such as photographs, video files, etc., associated with a detected safety event.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example System Overview

FIG. 1A illustrates an event analysis system 120 in communication with a controller 114 and a safety admin system 130. In this embodiment, the vehicle 110 includes a controller 114, which may be coupled to a plurality of sensor devices (or "sensors") 112, such as vehicle cameras. In some embodiments, the controller 114 itself includes a vehicle camera, such as the example vehicle camera illustrated in FIGS. 1B-1D. In other embodiments, the controller 114 may include other components.

The sensor devices 112 may include, for example, one or more inward-facing camera and one or more outward-facing camera. The controller 114 further includes one or more microprocessors and communication circuitry configured to transmit data to the event analysis system 120, such as via one or more of the networks 150, 160. In this example, a safety dashboard 132 may be generated on a safety admin system 130 to illustrate event data from the event analysis system 120, such as via an online portal, e.g., a website or standalone application. The safety admin system 130 may be operated, for example, by a safety manager that reviews information regarding triggered safety events associated with a fleet of drivers/vehicles.

Various example computing devices 112, 114, 120, and 130 are shown in FIG. 1A. In general, the computing devices can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A computing device may execute an application (e.g., a browser, a stand-alone application, etc.) that allows a user to access interactive user interfaces, view images, analyses, or aggregated data, and/or the like as described herein. In various embodiments, users may interact with various components of the example operating environment (e.g., the safety admin system 130, the event analysis system 120, etc.) via various computing devices. Such interactions may typically be accomplished via interactive graphical user interfaces or voice commands, however alternatively such interactions may be accomplished via command line, and/or other means.

As shown in the example of FIG. 1A, communications between the controller 114 and event analysis system 120 primarily occurs via network 150, while communication between the event analysis system 120 and safety admin system 130 typically occurs via network 160. However, networks 150, 160 may include some or all of the same communication protocols, services, hardware, etc. Thus, although the discussion herein may describe communication between the controller 114 and the event analysis system 120 via the network 150 (e.g., via cellular data) and communication between the event analysis system 120 and the safety admin system 130 via a wired and/or a wireless high-speed data communication network, communications of the devices are not limited in this manner.

In some embodiments, the vehicle device transmits encrypted data via SSL (e.g., 256-bit, military-grade encryption) to the event analysis system 120 via high-speed 4G LTE or other wireless communication technology, such as 5G communications. The network 150 may include one or more wireless networks, such as a Global System for Mobile Communications (GSM) network, a Code Division Multiple Access (CDMA) network, a Long-Term Evolution (LTE) network, or any other type of wireless network. The network 150 can use protocols and components for communicating via the Internet or any of the other aforementioned types of networks. For example, the protocols used by the network 150 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The network 160 may similarly include any wired network, wireless network, or combination thereof. For example, the network 160 may comprise one or more local area networks, wide area network, wireless local area network, wireless wide area network, the Internet, or any combination thereof.

Figure 1B:
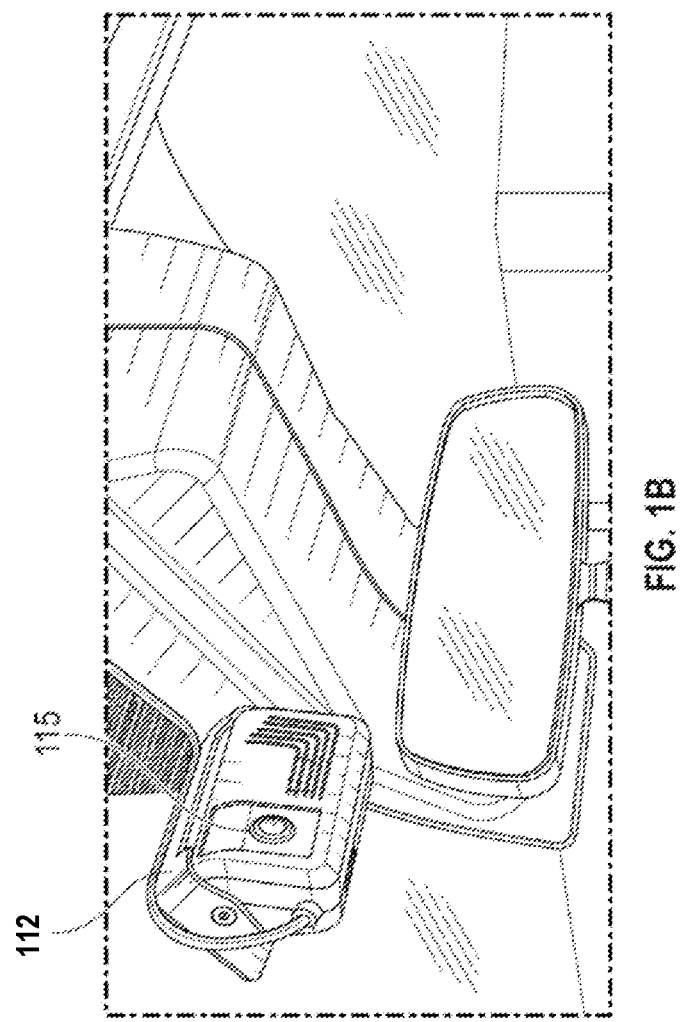
FIG. 1B illustrates an example vehicle device with an inward-facing camera mounted inside a vehicle.
Figure 1C:
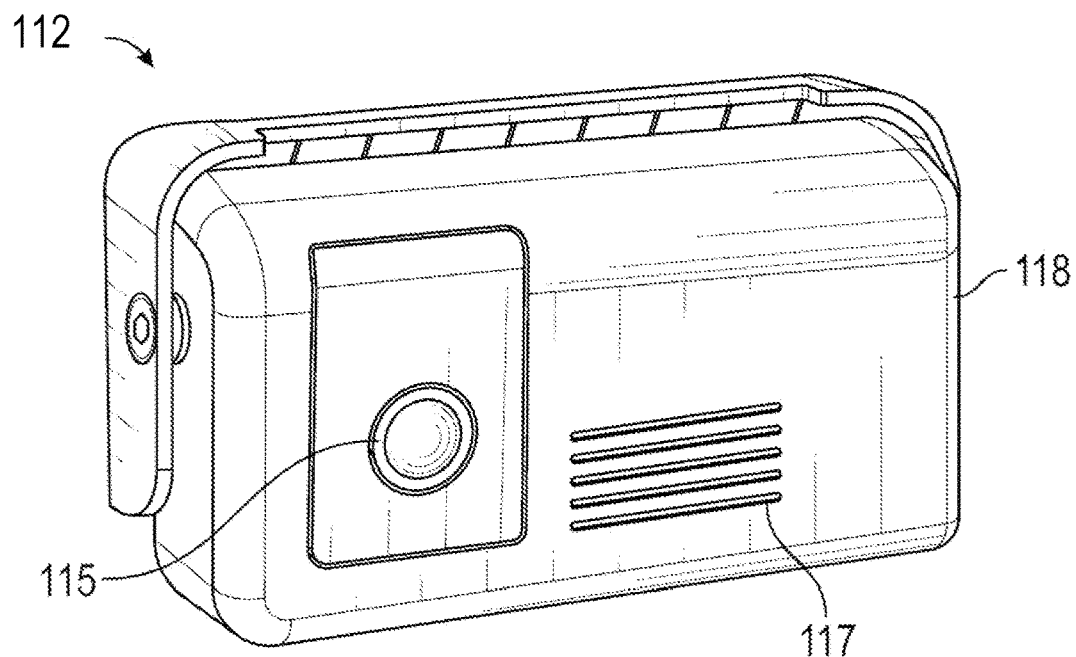
FIG. 1C is a front view of the vehicle device showing the inward-facing camera.
Figure 1D:
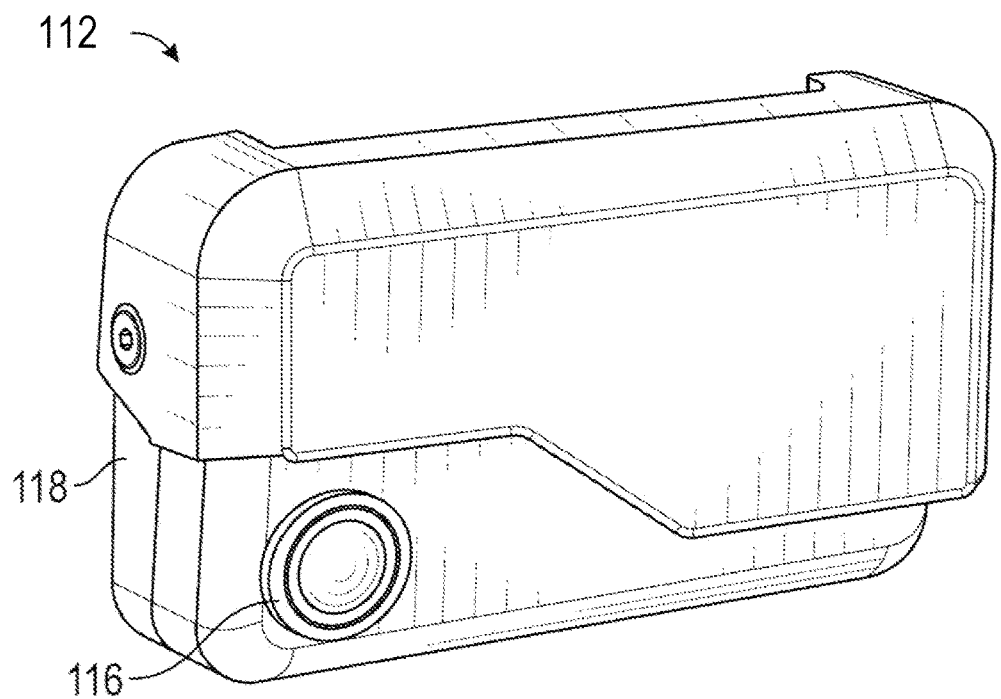
FIG. 1D is a rear view of the vehicle device showing an outward-facing camera (e.g., positioned to obtain images forward of the vehicle).

FIG. 1B illustrates an example sensor device 112 with an inward-facing camera 115 mounted inside a vehicle. FIG. 1C is a front view of the sensor device 112 showing the inward-facing camera 115, and FIG. 1D is a rear view of the sensor device 112 showing an outward-facing camera 116 (e.g., positioned to obtain images forward of the vehicle). In this example, the sensor device 112 includes an access panel 117 configured to allow alert signals from a speaker within the enclosure 118 of the sensor device 112 to be better heard within the vehicle. In some embodiments, a microphone is positioned behind the access panel 117 also, or behind a similar additional access panel. In other embodiments, the vehicle device may include different quantities of video and/or still image cameras. For example, as discussed in further detail below, in some embodiments, sensor devices may be positioned at various locations inside and/or outside a vehicle, and the sensor devices may have varying sets of sensors and corresponding sensor outputs.

The dual-facing cameras (e.g., the inward-facing camera 115 and one or more outward-facing cameras 116) may be configured to automatically upload and/or analyze footage using event detection models configured to detect (or "trigger") safety events. For example, as discussed further herein, a controller 114 may advantageously apply event detection models to received sensor data, including video data from one or more of the sensor devices, to detect safety events in real time as the events are happening. In some embodiments, sensors devices may include event detection logic also.

While the specifications of sensor devices may vary greatly from one implementation to another, in one example embodiment a sensor device may include some or all of the components below:

- Outward-facing camera with a field of view of 121° or more, resolution of at least 1080p (Full HD) video, frame rate of at least 30 frames per second, HDR to optimize for bright and low-light conditions.
- Inward-facing camera with a field of view of 177° or more to identify unsafe in-cab behaviors, resolution of at least 720p (HD) video, frame rate of at least 30 frames per second, infrared LED for unlit nighttime in-cab video.
- Audio input and/or output device(s) configured to provide voice coaching, such as voice-based feedback and alerts in response to detection of safety events, as well as the ability to turn on audio capture (e.g., via one or more microphones) for extra context during disputes and incidents.
- Recording capabilities and storage to record video footage for a rolling time period.
- Still images may also be captured and stored locally and/or transmitted to the event analysis system via a controller. A panic button may be provided to allow the driver to manually trigger a safety event and upload video footage from one or more of the cameras. For example, the panic button may be a physical button on the vehicle device enclosure 118 and/or a virtual (or software) button that may be activated by a voice command from the driver (or a passenger in the vehicle).
- One or more accelerometers, such as accelerometers that measure acceleration (and/or related G forces) in each of multiple axes, such as in an X, Y, and Z axis.
- One or more computer processors, such as high-capacity processors that enable concurrent neural networks for real-time artificial intelligence.

The various example computing devices 112, 114, 120, 130, and others, can include a computing device such as a server, server farm, virtual computing device, desktop, laptop or tablet computer, personal computer, tablet computer, wearable computer, server, personal digital assistant (PDA), hybrid PDA/mobile phone, mobile phone, smartphone, set top box, voice command device, digital media player, and the like. A computing device may execute an application (e.g., a browser, a stand-alone application, etc.) that allows a user to access interactive user interfaces, view images, analyses, or aggregated data, and/or the like as described herein. In various embodiments, users may interact with various components of the example operating environment via various computing devices. Such interactions may be accomplished via interactive graphical user interfaces, however alternatively such interactions may be accomplished via command line, and/or other means.

Example Sensor Device and Controller Configurations

Figure 2A:
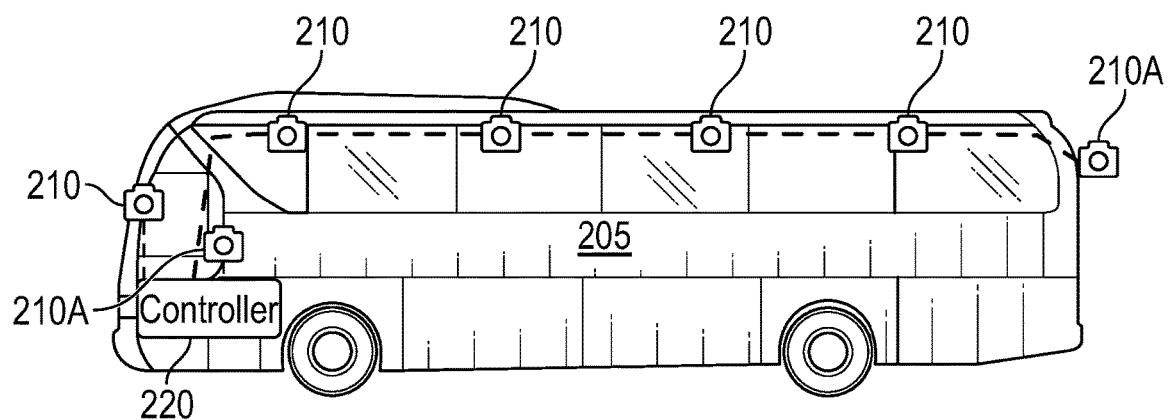
FIG. 2A is a side view and FIG. 2B is a top view of a bus, or other vehicle, illustrating example placements of multiple camera devices (e.g., cameras, such as dash cams) inside and/or outside the vehicle.
Figure 2B:
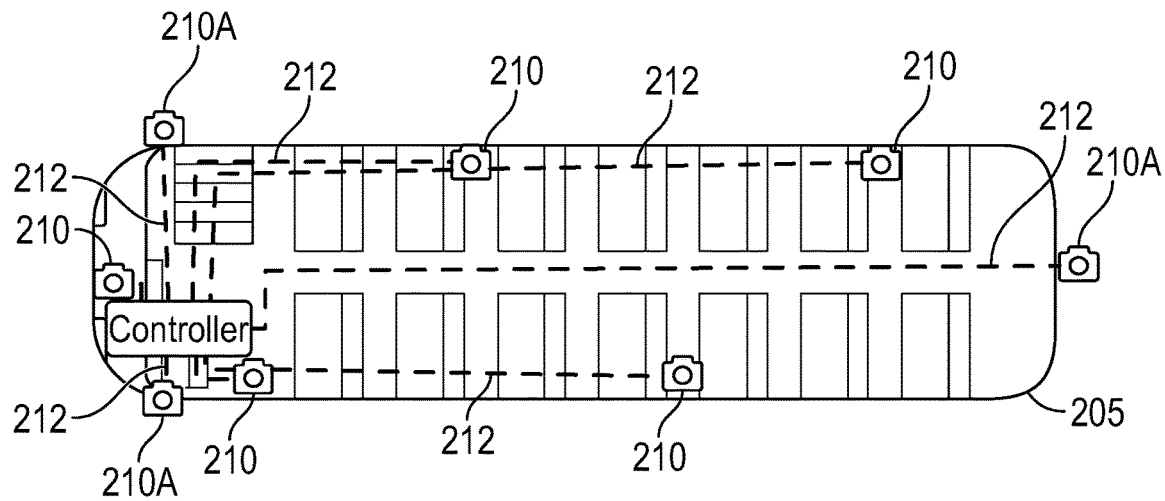

FIG. 2A is a side view and FIG. 2B is a top view of a bus 205, or other vehicle, illustrating placement of multiple camera devices (e.g., cameras, such as dash cams and/or cameras configured for mounting at other internal or external vehicle locations) 210 inside and/or outside the vehicle. In this example, cameras 210 are positioned at various locations within the vehicle, with cameras 210A positioned on an outer surface of the vehicle (and/or positioned to capture images outside the vehicle). As shown, each of the cameras 210 are separately connected to a controller 220, which may comprise some or all of the functionality of the controller 114 of FIG. 1. Thus, as shown in FIG. 2B, multiple cables 212 extend across various portions of the vehicle 205 to all couple directly with the controller 220. Depending on the vehicle, placement of such cables (e.g., electrical wiring) may involve drilling, patching, painting, etc. to place the multiple cables in various locations of the vehicle. Thus, reduction of the number of cables connecting sensor devices to the controller is desired.

Figure 2C:
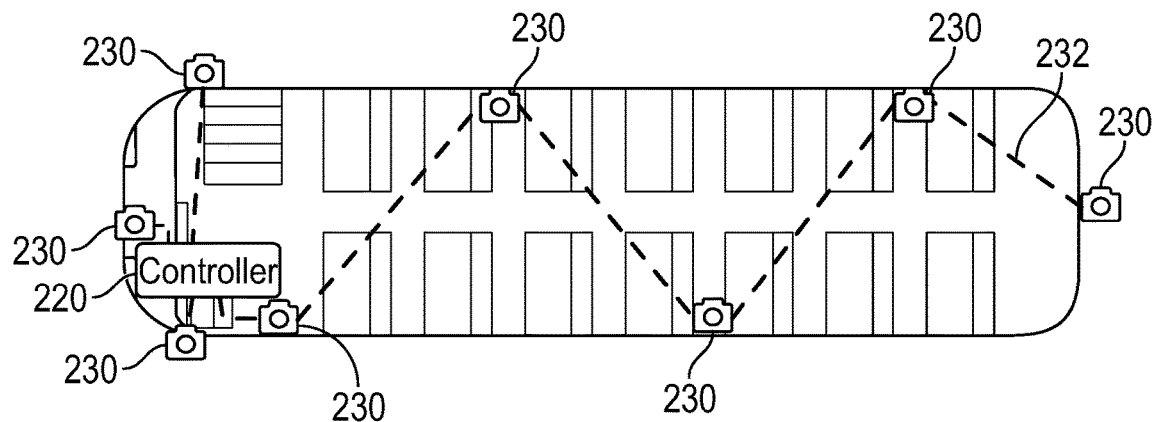
FIG. 2C is another top view of the vehicle of FIG. 2A, with cameras in a different arrangement and coupled together with cables in a serial configuration that reduces wiring requirements within the vehicle.

FIG. 2C is another top view of the vehicle 205, now with cameras 230 in place of the cameras 210, and coupled together with cables 232 in a serial configuration that reduces wiring requirements within the vehicle. Thus, in this configuration, the complexity of wiring the cameras so that communications with the controller 220 may occur is greatly reduced, as well as the amount of cabling needed to establish communications between the controller 220 and each of the sensor devices 230.

Figure 3A:
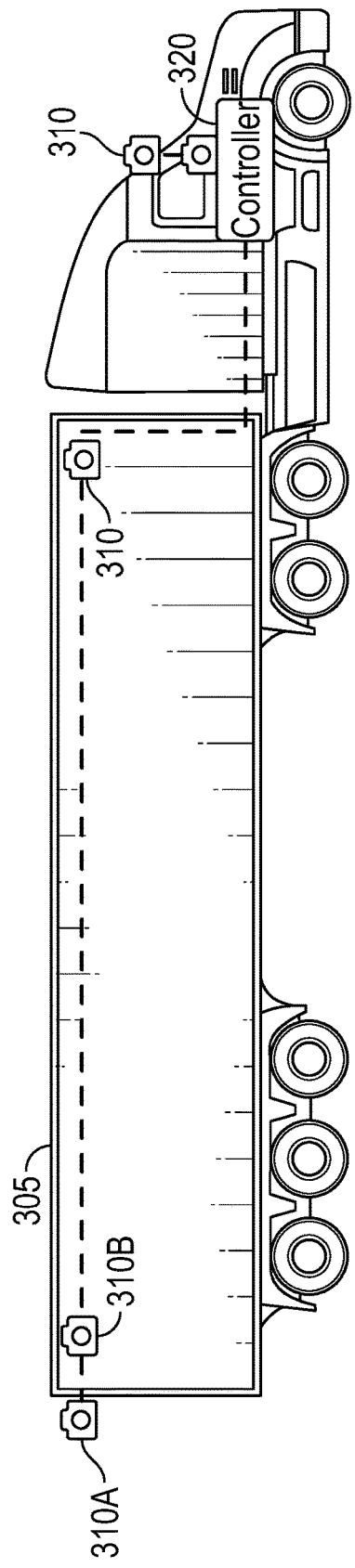
FIGS. 3A and 3B illustrates a semi-truck with a first configuration of cameras in the side and top views, respectively.
Figure 3B:
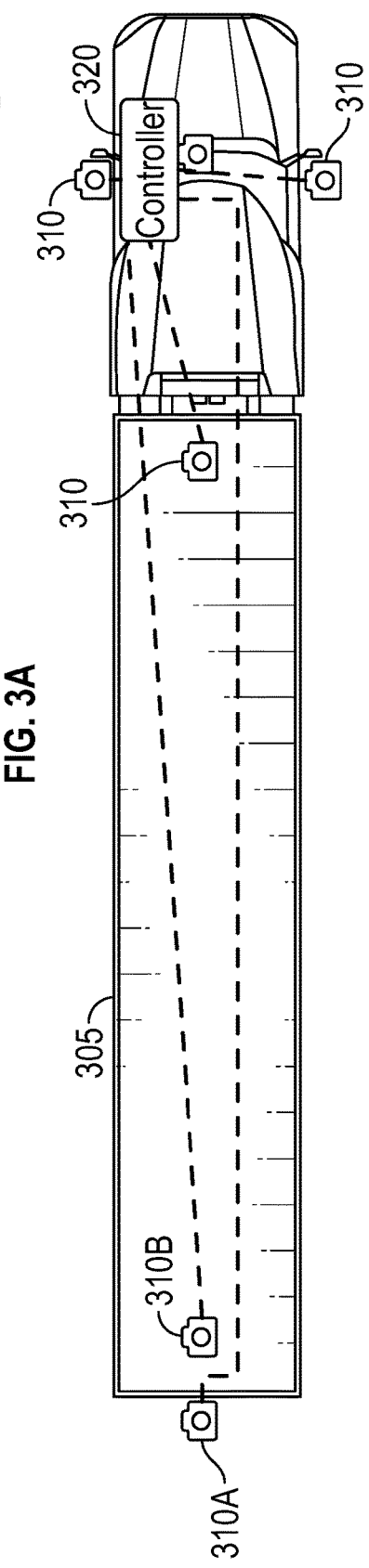
Figure 3C:
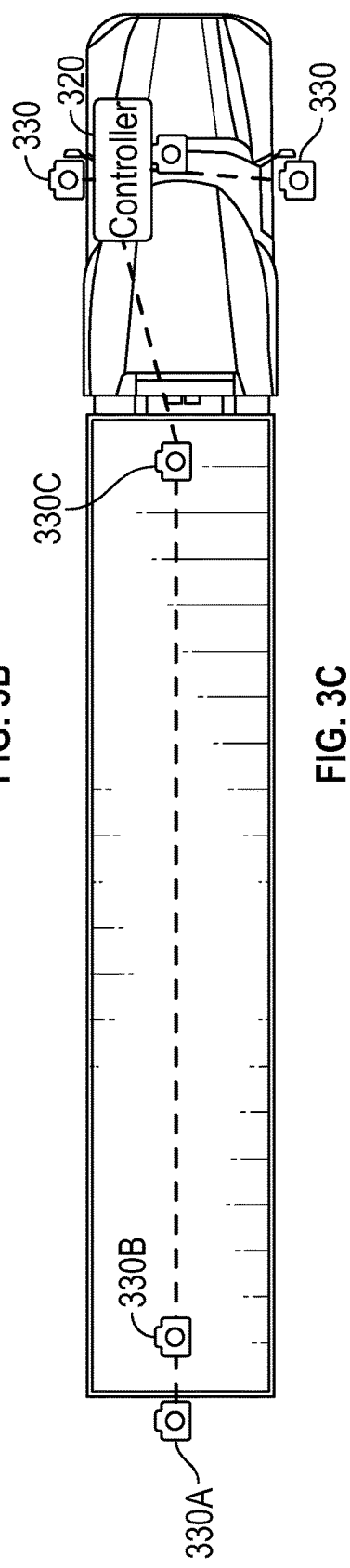
FIG. 3C another top view of the semi-truck with cameras in a different, more efficient configuration.

FIGS. 3A and 3B illustrate a semi-truck 305 with a first configuration of cameras in the side and top views of FIGS. 3A and 3B, and a second more efficient configuration of cameras in FIG. 3C. As shown in FIGS. 3A and 3B, each of the cameras 310 includes a separate cabling from the camera to a controller 320. Thus, in this example with two cameras near a rear of the semi-truck trailer, e.g., external camera 310A and rear internal camera 310B, two sets of wiring (e.g., two separate cables) extend substantially the length of the semi-trailer to reach the controller 320 in a front portion of the vehicle. Advantageously, in the embodiment of FIG. 3C, the multiple cameras 330 are connected in series, which is generally referred to herein as being daisy-chained together, so that a reduced set of cables is required, including only a single cable between the rear cameras 330A and 330B and a trailer front camera 330C.

Figure 3D:
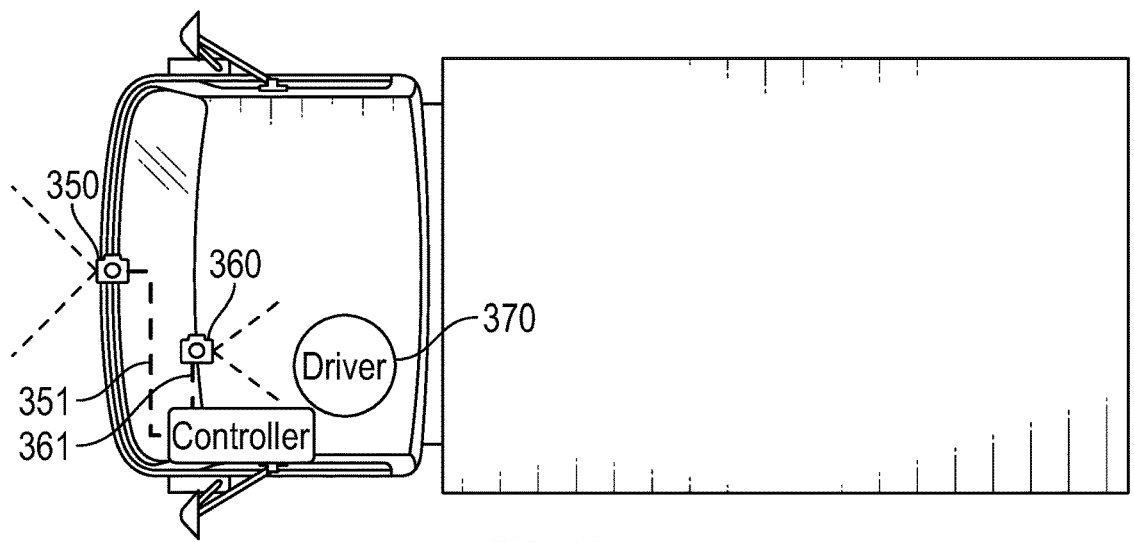
FIG. 3D is as top view of a vehicle illustrating an example of wiring of two separate cameras in the cab of a vehicle.
Figure 3E:
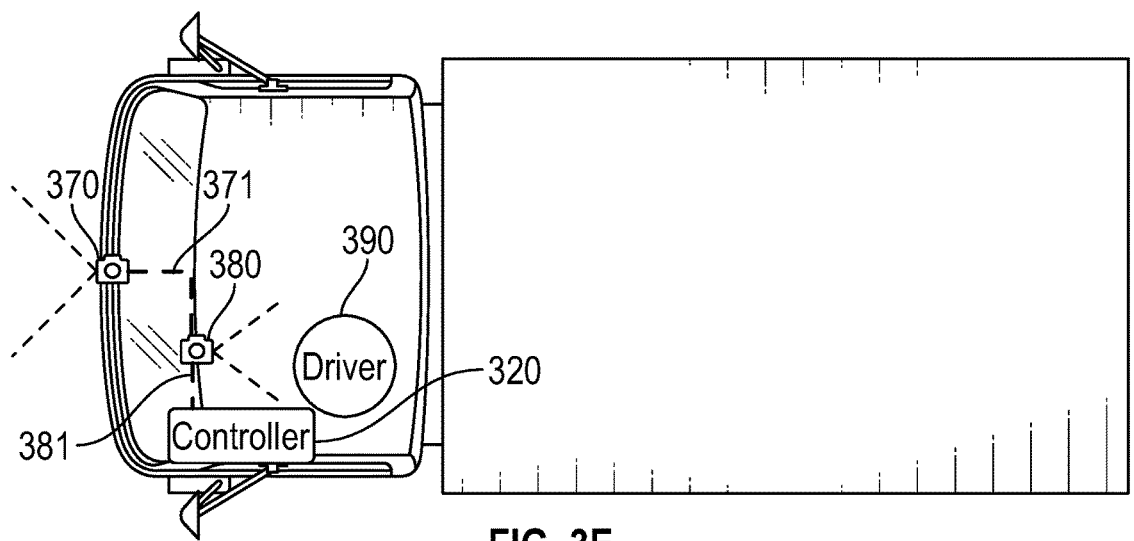
FIG. 3E is a top view and FIG. 3F is a side view of an example vehicle having an outward-facing camera positioned in the center of the vehicle, and an inward-facing camera placed directly in front of a vehicle driver.
Figure 3F:
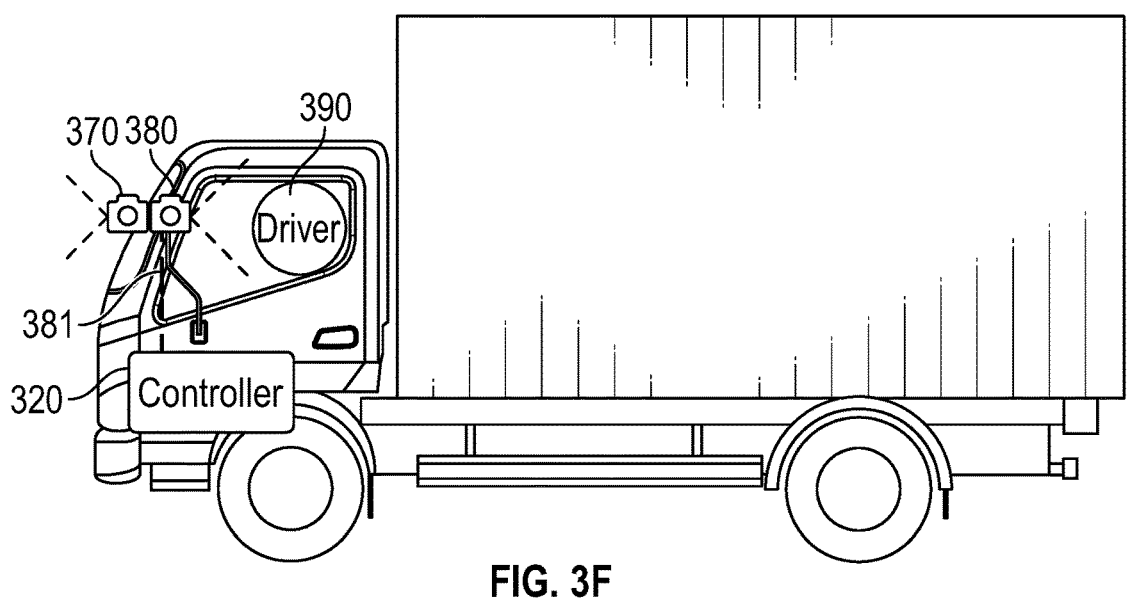

In some embodiments, optimal positions of an inward and outward-facing camera within a vehicle may not be the same. For example, the inward facing camera may provide more useful images when placed directly in front of the driver of the vehicle, while the outward facing camera may provide more useful images when placed in a center of the vehicle. FIG. 3D is as top view of a vehicle illustrating an example of wiring of two separate cameras in the cab of a vehicle. In this example embodiment, a forward-facing camera 350 is mounted in a center of the cab, while an inward facing camera 360 is mounted directly in front of the driver 370. In this example, each of the cameras is separately wired (wiring 351 and 361) to the controller. While the implementation of FIG. 3D allows independent positioning of inward and outward facing cameras, using the daisy chaining methodology discussed herein, installation and operation of inward and outward-facing cameras mounted in a vehicle cab may be optimized. For example, FIG. 3E is a top view and FIG. 3F is a side view of an example vehicle having an outward-facing camera 370 positioned in the center of the vehicle, and an inward-facing camera 380 placed directly in front of a vehicle driver 390. In this example, a single wiring 371 couples the first camera 370 with the second camera 380, and a single wiring 381 then connects the inward facing camera 380 with the controller 320. As discussed further herein, the video and/or audio data from camera 370 may be combined in a data stream by the inward-facing camera 380 (e.g., using virtual channels, frame merging, and/or other technology) such that video and/or audio data from both of the cameras 370 and 380 is transmitted to the controller 320 via single wiring 381.

Figure 4:
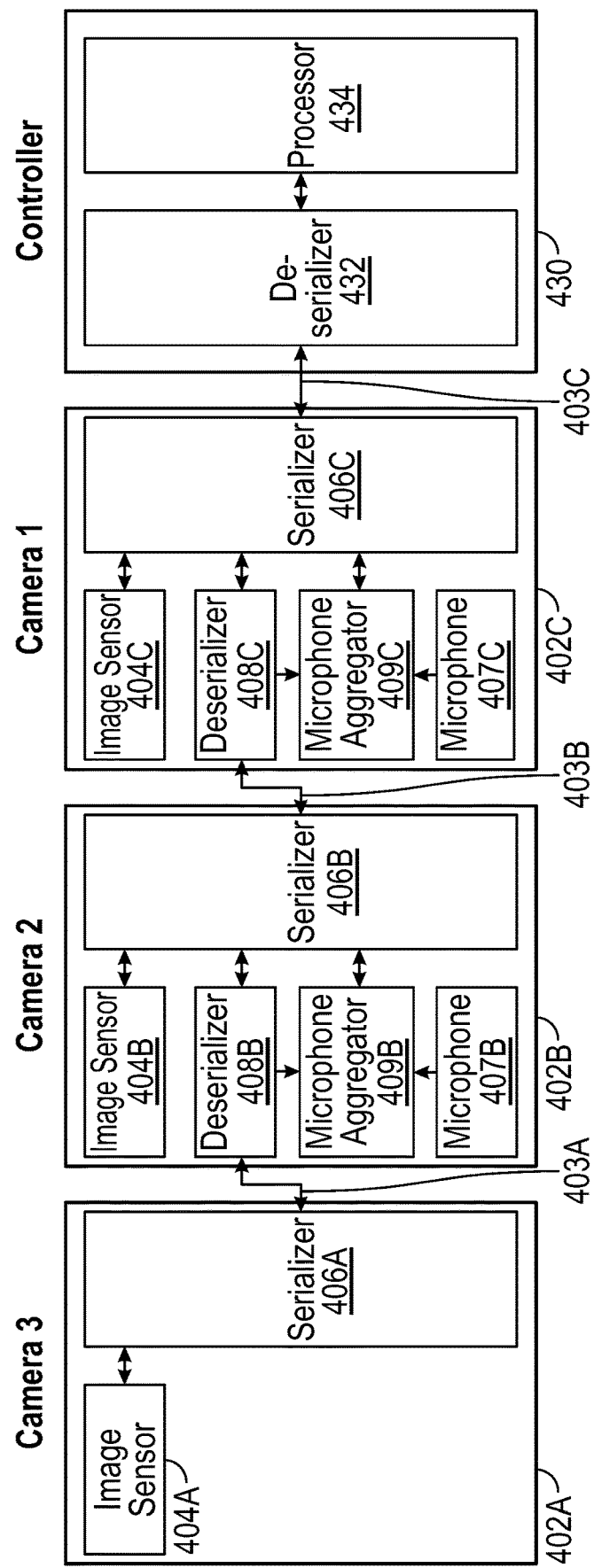
FIG. 4 is a block diagram illustrating an example configuration of three cameras in communication with a controller via serial connections of the cameras.

FIG. 4 is a block diagram illustrating an example configuration of three cameras 402 (including cameras 402A, 402B, and 402C) in communication with a controller 430 via serial connections of the cameras 402. In this example, camera 402A includes one or more image sensors 404A (e.g., CMOS sensors that obtain video images) that may be positioned in or on a vehicle at a furthest location from the controller 430. The camera 402A also includes a serializer 406A configured to convert the video data from image sensor 404A into a serial data stream that is communicated to a next camera 402B via a serial communication channel 403A. The camera 402B receives the serial data including the video stream from the image sensor 404A at a deserializer 408B that is configured to decode the serialized data back into the video data that was originally serialized by serializer 406A. The camera 402B also includes an image sensor 404B, which may be a camera positioned at a position more proximate the controller 430 than camera 402A. In this embodiment, the serial connection 403A between camera 402A and camera 402B may be significantly shorter than the electrical wiring that would be required for camera 402A to be connected directly with controller 430. In an example where the vehicle is a bus or semi-truck, for example, the wiring required to reach a controller 430 positioned at a front of the vehicle would be significantly more than required to couple camera 402A only to camera 402B, which may be positioned at some intermediate position between a rear and front of the vehicle.

In this example, the camera 402B also includes one or more microphones 407B that each provide an output to a microphone aggregator 409B that may combine the multiple microphone inputs into a single audio stream. The serializer 406B thus receives as inputs a video stream from image sensor 404B and from deserializer 408B, as well as an audio stream from microphone aggregator 409B. Thus, this example serializer 406B converts the video data from image sensor 404A and 404B, as well as any audio data from microphone aggregator 409B into a serial data stream that may be transmitted in a single cable 403B that is coupled to a camera 402C. In the embodiment of FIG. 4, camera 402C has a same configuration as camera 402B, including an image sensor 404C, a deserializer 408C, one or more microphones 407C, a microphone aggregator 409C, and a serializer 406C. In this configuration, the deserializer 408C outputs two video streams to the serializer 406C (the video stream from image sensor 404A and the video stream from image sensor 404B). Serializer 406C, in turn, converts three video streams (e.g., from image sensor 404A and 404B via the deserializer 408C, as well as for video stream from image sensor 404C) to a serial communication that is transmitted via a single cable 403C to a controller 430.

The controller 430 includes one or more processors 434 and/or any other computer components that may be part of a silicon on-chip ("SOC") or microcontroller device that communicates with a deserializer 432 to decode separate video streams that are transmitted in the serial communication from the camera 402C into a usable video file format. In this example, the deserializer 432 may output three different video streams, e.g., corresponding to the video data obtained by image sensors 404A, 404B, and 404C.

In other embodiments, other quantities of cameras may be daisy chained together in a similar manner, e.g., with a serializer converting one or more video streams into an output stream and a deserializer that receives a serial input stream that may be processed to extract multiple separate video streams.

Figure 5:
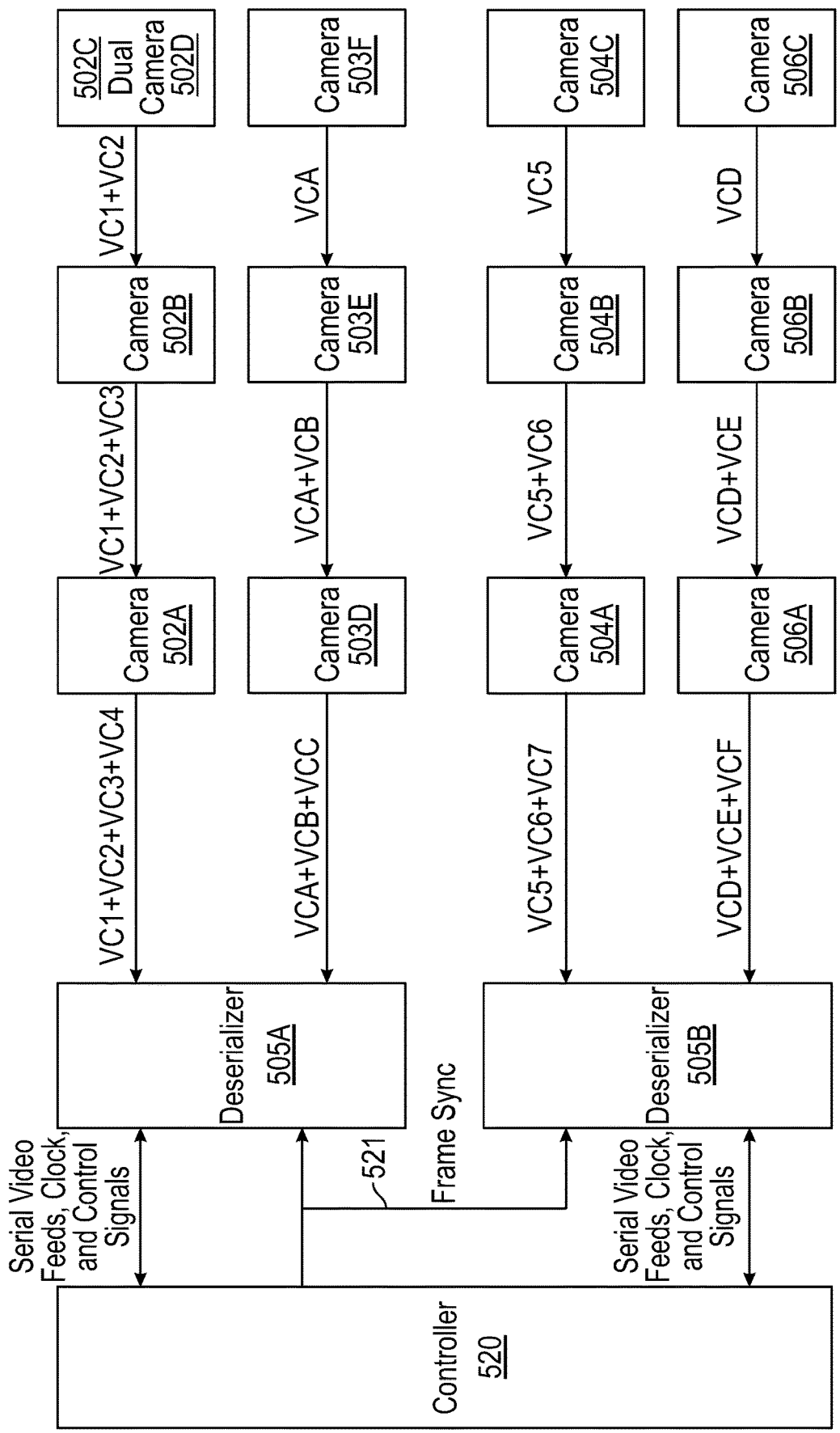
FIG. 5 is a block diagram of another example implementation of daisy chaining cameras to simplify camera installation, minimize number of cables entering a main cabin where the controller may be positioned, possibly reducing number of holes and/or reducing the size of holes required for cabling, and/or reducing the number of camera ports and/or connectors on the controller.

FIG. 5 is a block diagram of another example implementation of daisy chaining cameras to simplify camera installation, minimize number of cables entering a main cabin where the controller may be positioned, possibly reducing number of holes and/or reducing the size of holes required for cabling, and/or reducing the number of camera ports and/or connectors on the controller. In this example, thirteen cameras are all positioned in or on a vehicle, and are all in communication with a controller 520 that may store and/or transmit each of the thirteen camera feeds, such as to an event analysis system 120 (FIG. 1) and/or safety dashboard 132 (FIG. 1), and/or any other authorized viewing device.

In this example, the controller receives input from two serializer's 505A and 505B, each of which receives multiple video streams from daisy-chained series of cameras. In one embodiment, the deserializers 505 transmit multiple video feeds to the controller 520, and the devices exchange clock and control signals. In this embodiment, the controller 520 also provides a frame sync signal 521 that is useful to synchronize the various video feeds from the two deserializers 505 and, correspondingly, from the multiple sets of daisy-chained cameras 502, 503, 504, and 506.

In the example of FIG. 5, the camera outputs are transmitted in virtual channels, indicated in FIG. 5 as "VC" with a corresponding reference number or letter, so that the receiving camera or other device may identify the particular camera that originated the particular video feed. For example, dual camera 502C, 502D, which may be a forward and rearward facing camera of a single camera device, such as is shown in FIGS. 1C and 1D, provides video data on two virtual channels, with VC1 used for the serial video stream associated with camera 502C and VC2 is used for the serial video stream associated with camera 502D. Thus, the camera 502B may deserialize the video data by recognizing the virtual channel associated with each set of received data so that video data from each of the camera may be separated and combined to recreate the video stream. The camera 502B receives data in the two virtual channels, VC1 and VC2, and add its own video fee to a new virtual channel VC3, for transmission of all three video streams in a serialized manner to camera 502A. Similarly, camera 502A combines its video feed in a virtual channel VC4 to the video feeds from cameras 502B, 502C, 502D, in a serial communication to deserializer 505A. Similarly, camera 503F uses a virtual channel VCA to identify its serial video stream, which is then added with a video stream from camera 503E in virtual channel VCB, and then with a serialized video stream from camera 503D in virtual channel VCC. The deserializer 505A may include separate deserializers for the inputs from cameras 502A and 503D, or may include a single deserializer configured to receive two separate serial feeds and decode the video stream into video files that are associated with particular cameras based on the virtual channel in which the serial video stream was received.

In the example of FIG. 5, a second deserializer 505B receives input via two serial data streams each including serial video data from multiple cameras. For example, virtual channels VC5, VC6, VC7 are associated with cameras 504C, 504B, 504A, respectively, and virtual channels VCD, VCE, VCF are associated with cameras 506C, 506B, 506A, respectively. In other embodiments, additional and/or fewer cameras may be serially connected in a similar manner.

FIG. 6 is another block diagram illustrating an example arrangement of cameras that may each be positioned at different locations within (or outside of) a vehicle and configured to communicate with a controller 620 via multiple serialized communication channels. In this example, a stereo dash cam 602, such as the dash cam illustrated in FIGS. 1B-1D may be positioned at a front windshield of a vehicle, so that an inward facing camera, such as using a 720p optical sensor, obtains image data within the cab of the vehicle, while an outward facing camera, such as using a 1080p optical sensor, obtains image data outside the vehicle. In this example, the stereo dash cam 602 includes three microphones and a speaker. As noted above with reference to FIG. 4, for example, these various sensor inputs (e.g., from the 1080p sensor, the 720p sensor, and the multiple microphones) may be combined into a single serialized data stream that is communicated via a single cable 603 to a deserializer 605A. In this example configuration, a left side camera 604, which includes a 1080p sensor, may be positioned to obtain images on a left side of the vehicle (e.g., either outside the vehicle or inside the vehicle). The left side camera 604 may transmit a serialized stream of its video data, in combination with audio data and/or other data in some embodiments, to the dual deserializer 605A, which may deserialize the data stream received on cable 605 in conjunction with deserializing the data stream on cable 603. Similarly, a second dual deserializer 605B receives a data stream on cable 607 from a right-side camera 606, as well as a data stream on cable 609 that includes three virtual channels associated with serialized video and/or audio data from a dome camera 608, a second dome camera 610, and a rear camera 612. Advantageously, cameras that are far from the controller 620, such as the rear camera 612, May provide its video data to the controller 620 not via a direct cabling (e.g., electrical wiring) along a length of the vehicle, which may require extensive wiring and modifications to the vehicle to retain and conceal the wires, but via a shorter cable 611 to the dome camera 610, which may be positioned in a rear or central portion of the vehicle.

In other embodiments, frame merging and/or other methods of tracking content from particular devices may be used as an alternative, or addition, to the use of virtual channels. As an example of frame merging, using two 1920×1080p cameras as an example, a frame from each camera could be combined or merged to create a larger frame with resolution of either 3840×1080p (side by side) or 1920×2160 (stacked on top of each other). The receiving camera may then dissect the merged frame to recover frames from each camera. This type of frame merging may be accomplished with components such as an SoC, FPGA or digital logic circuit to buffer each camera frame into memory to create the larger merged frame. However, in the embodiments discussed herein, the deserializers may incorporate line buffers that make it possible to support merged frame outputs without additional hardware components.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA)

instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A camera kit comprising:
a controller configured to store video data from a plurality of camera devices positioned on a vehicle;
the plurality of camera devices each including at least:
an optical sensor configured to capture a video data stream;
a deserializer configured to receive a serial data stream from a downstream camera device and to convert the serial data stream into one or more separate video data streams;
a serializer configured to generate an output serial data stream including the captured video data stream and the deserialized separate video data streams, and
an output port configured to transmit the output serial data stream to an upstream camera device;
wherein the controller is further configured to:
detect sequential powering-on of individual camera devices of the plurality of camera devices;
in response to detecting a newly powered on camera device, assign a virtual channel identifier to the newly powered on camera device, wherein each of the plurality of camera devices is assigned a unique virtual channel identifier;
receive a combined serial data stream from a proximal camera device of the plurality of camera devices, the serial data stream including a series of virtual channel identifiers followed by video data from the respective camera device; and deserialize the combined serial data stream based on associations between virtual channel identifiers and video data in the combined serial data stream to generate a plurality of separate video data streams associated with a corresponding plurality of camera devices; and store the separate video data streams for the corresponding plurality of camera devices.

2. The camera kit of claim 1, wherein respective output serial data streams from camera devices are each transmitted on a single cable.

3. The camera kit of claim 2, wherein the single cable comprises a single wire or twisted pair of wires.

4. The camera kit of claim 1, wherein the proximal camera device of the plurality of camera devices is coupled to the controller via a single cable.

5. The camera kit of claim 1, wherein the serializer is further configured to include one or more audio data streams in the output serial data stream.

6. The camera kit of claim 1, wherein the controller is configured to communicate separately with each of the plurality of cameras.

7. The camera kit of claim 6, wherein the controller is configured to communicate separately with each of the plurality of cameras regarding one or more of exposure control, focus control, white balance, HDR, and distortion correction.

8. The camera kit of claim 1, wherein each camera is associated with a unique physical address and includes an ethernet switch.

9. The camera kit of claim 1, wherein the output serial data streams are compressed.

10. A computerized method comprising:

electronically coupling a controller to a first of a plurality of cameras, the controller configured to store video data from each of the plurality of cameras positioned on a vehicle, wherein each of the plurality of cameras is coupled to another of the plurality of cameras;

sequentially power-on individual cameras of the plurality of cameras;

wherein the controller is configured to, in response to detecting a newly powered on camera, assign a virtual channel identifier to the camera, wherein each of the plurality of cameras is assigned a unique virtual channel identifier;

receiving a serial data stream including video data from each of the plurality of cameras;

generating separate video data streams for each of the plurality of cameras by deserializing the serial data stream based on associations between virtual channel identifiers and video data in the serial data stream; and storing or transmitting the separate video data streams.

11. The computerized method of claim 10, wherein each of the plurality of cameras includes a deserializer configured to receive a serial data stream from a downstream camera and to convert the serial data stream into one or more separate video data streams.

12. The computerized method of claim 10, wherein each of the plurality of cameras includes a serializer configured to generate an output serial data stream including the captured video data stream and the deserialized separate video data streams.

13. The computerized method of claim 10, wherein respective output serial data streams from cameras are each transmitted on a single cable.

14. The computerized method of claim 10, wherein a proximal camera of the plurality of cameras is coupled to the controller via a single cable that provides video data streams from all of the plurality of cameras to the controller.

15. The computerized method of claim 10, wherein the output serial data stream includes a series of virtual channel identifiers followed by video data from respective cameras.

16. The computerized method of claim 10, wherein the serial data stream is further configured to include one or more audio data streams.

17. The computerized method of claim 10, further comprising:

transmitting control signals from the controller to individual cameras, the control signals configured to cause adjustment of one or more of exposure control, focus control, white balance, HDR, or distortion correction at the individual camera.

* * * * *